United States Patent
Beghtel et al.

(10) Patent No.: US 7,093,253 B2
(45) Date of Patent: Aug. 15, 2006

(54) METHOD, COMPUTER PROGRAM PRODUCT, AND SYSTEM FOR A SELF-THROTTLED COMPUTING TASK

(75) Inventors: Merle R. Beghtel, San Jose, CA (US); Harley Al Beier, San Martin, CA (US); Charles Alexander Goodwyn, Jr., Sunnyvale, CA (US); Dean Lynn Grover, Hollister, CA (US); Claudia Si-man Ho, San Jose, CA (US); Percy Tzu-jung Li, Morgan Hill, CA (US); Joaquin Ramirez, San Jose, CA (US); Vern Lee Watts, Los Altos, CA (US)

(73) Assignee: International Business Machines Corporation, Armonk, NY (US)

( * ) Notice: Subject to any disclaimer, the term of this patent is extended or adjusted under 35 U.S.C. 154(b) by 870 days.

(21) Appl. No.: 10/005,731

(22) Filed: Nov. 6, 2001

(65) Prior Publication Data

US 2003/0088605 A1    May 8, 2003

(51) Int. Cl.
*G06F 9/46* (2006.01)
(52) U.S. Cl. ...................................... 718/102; 718/103
(58) Field of Classification Search ................ 718/100, 718/102–105, 107–108
See application file for complete search history.

(56) References Cited

U.S. PATENT DOCUMENTS

| | | | |
|---|---|---|---|
| 4,145,735 A * | 3/1979 | Soga ........................... 710/264 |
| 5,161,227 A | 11/1992 | Dias et al. ................... 395/650 |
| 5,283,896 A | 2/1994 | Temmyo et al. ............ 395/650 |
| 5,757,788 A | 5/1998 | Tatsumi et al. ............. 370/336 |
| 5,999,963 A * | 12/1999 | Bruno et al. ................ 718/104 |
| 6,070,170 A | 5/2000 | Friske et al. ................ 707/202 |
| 6,115,781 A * | 9/2000 | Howard ........................ 711/4 |
| 6,148,322 A * | 11/2000 | Sand et al. ................. 718/103 |
| 6,601,083 B1 * | 7/2003 | Reznak ........................ 718/104 |
| 2003/0061260 A1 * | 3/2003 | Rajkumar .................... 709/104 |

\* cited by examiner

*Primary Examiner*—Thomas Lee
*Assistant Examiner*—Albert Wang
(74) *Attorney, Agent, or Firm*—Kunzler & Associates

(57) ABSTRACT

A throttling specification is received by a computer task to direct the computer task's usage of critical computer resources, such as CPU cycles. The computer task comprises units of work, and the elapsed time of each unit of work is calculated as each unit of work completes. Upon the completion of one unit of work, a suspension time is calculated based at least partially on the throttling specification and the elapsed time corresponding to the completed unit of work. Prior to initiating the next unit of work for the computer task, the computer task is suspended for the calculated suspension time. In this manner, other important computing tasks operating in the computer system have access to critical computer resources during the suspension period. Even though the computer task may be given the highest possible priority to ensure a timely and predictable completion, total monopolization of critical computer resources is avoided.

21 Claims, 3 Drawing Sheets

METHOD, COMPUTER PROGRAM PRODUCT, AND SYSTEM FOR A SELF-THROTTLED COMPUTING TASK

FIELD OF INVENTION

The present invention relates to the allocation of computer resources in a multi-tasking computer system. More particularly the present invention concerns managing the use of computer resources to facilitate meeting throughput and response-time computing objectives.

BACKGROUND

Databases have wide spread usage in many large enterprises where high transaction volume, reliability, availability and scalability are of the utmost importance. Typically, these enterprise databases are very large with entries that number into the millions and their reliable operation is critical to the success of the enterprise.

An example of databases with these characteristics is Information Management System (IMS) databases, developed by International Business Machines Corporation. (IMS is a trademark of International Business Machines Corporation in the United States, other countries, or both.)

Due to the high volume of transactions, it is necessary from time to time to re-organize these databases to minimize the performance impact of usage induced fragmentation of the data and related records within the database. Re-organizing a database returns the structure of the database to a non-fragmented state yielding significant performance improvement over an equivalent fragmented database. Those of ordinary skill in the art will appreciate that significant performance improvement for database transactions can be realized by keeping related pieces of information proximate to each other in storage.

However, with large databases comprising millions of records, a reorganization process takes significant amounts of computer resources and, even with dedicated computer resources, may take several hours of elapsed time to complete. These extended time frames may create several problems that the enterprise must deal with. First, the extended reorganization time increases the possibility that a disruptive event or failure could occur prior to completion of the reorganization. It is highly desirable to complete long running jobs without incidence due to the complications of continuing to endure poor performance on the fragmented database, as well as wasted time and effort in restarting (or starting over) the lengthy reorganization process. Accordingly, it is not surprising to find that when reorganization of a large database is required, an enterprise typically assigns very high priority to the reorganization task in order to ensure completion of the reorganization in a predictable and timely manner. This high task priority directs the workload manager (or task scheduler) component of the operating system (or subsystem) to prioritize the availability of critical computing resources for these high priority tasks, thereby facilitating the timely completion of these tasks without unanticipated delays. Examples of critical computer resources typically include CPU cycles, I/O buffers, I/O channels, and the like.

However, simply assigning a very high priority to a task may create another problem. Namely, a very high priority, long running task can tie up critical computer resources for extended periods of time and thereby cause significant disruption to other important work in the system. When online response times undergo substantial degradation, users of the computing system may become frustrated and unproductive. Thus, on one hand the enterprise desires to assign very high priorities for large database reorganizations to ensure timely and predictable completion; but on the other hand, this may be disruptive to users of the database concurrently initiating online transactions with expectations of achieving reasonable response times.

While it is possible to temper the negative effects of these problems by adjusting the priorities of the reorganization task and/or the tasks of other important work in the computer system, this option risks significant delay of the database reorganization which may be unacceptable to an enterprise. That is, if the priority of the database reorganization is lowered relative to other tasks, the resultant effect may be to allow too much computer resource to be diverted away from the reorganization task with the undesirable result of unanticipated, extended delays in realizing the completed reorganization.

Accordingly, there is a need to ensure the timely completion of a critical database reorganization, or other high priority computing process of a very long duration, while avoiding the monopolization of computer resources such that shorter tasks of relatively high priority can complete without extended delays.

SUMMARY OF THE INVENTION

To overcome the limitations briefly described supra, the present invention provides a method, computer program product, and system for self-throttling the use of computer resources by a computer task executing on a computer system in order to avoid the monopolization of critical computer resources for extended periods of time.

A throttling specification is received by a computer task to direct the computer task's usage of critical computer resources, such as CPU cycles. The computer task comprises units of work, and the elapsed time of each unit of work is calculated as each unit of work completes. Upon the completion of one unit of work, a suspension time is calculated based at least partially on the throttling specification and the elapsed time corresponding to the completed unit of work. Prior to initiating the next unit of work for the computer task, the computer task is suspended for the calculated suspension time. In this manner, other important computing tasks operating in the computer system have access to critical computer resources during the suspension period. Therefore, even though the computer task may be given the highest possible priority to ensure a timely and predictable completion, total monopolization of critical computer resources is avoided.

In another embodiment of the present invention, the above-described self-throttling method may be provided as a computer system. The present invention may also be tangibly embodied in and/or readable from a computer-readable medium containing program code (or alternatively, computer instructions.) Program code, when read and executed by a computer system, causes the computer system to perform the above-described method.

Various advantages and features of novelty, which characterize the present invention, are pointed out with particularity in the claims annexed hereto and form a part hereof. However, for a better understanding of the invention and its advantages, reference should be made to the accompanying descriptive matter, together with the corresponding drawings which form a further part hereof, in which there is described and illustrated specific examples of preferred embodiments in accordance with the present invention.

BRIEF DESCRIPTION OF THE DRAWINGS

The preferred embodiments of the present invention will hereinafter be described in conjunction with the appended drawings, where like reference numbers denote the same element throughout the set of drawings.

DESCRIPTION OF THE PREFERRED EMBODIMENTS

The preferred embodiment in accordance with the present invention is directed to a system, computer program product, and method for self-throttling the use of computer resources by a computer task. The following description is presented to enable one of ordinary skill in the art to make and use the present invention and is provided in the context of a patent application and its requirements. Various modifications to the preferred embodiment will be readily apparent to those skilled in the art and the teaching contained herein may be applied to other embodiments. Thus, the present invention should not be limited to the embodiments shown but is to be accorded the widest scope consistent with the principles and features described herein.

Figure 1:
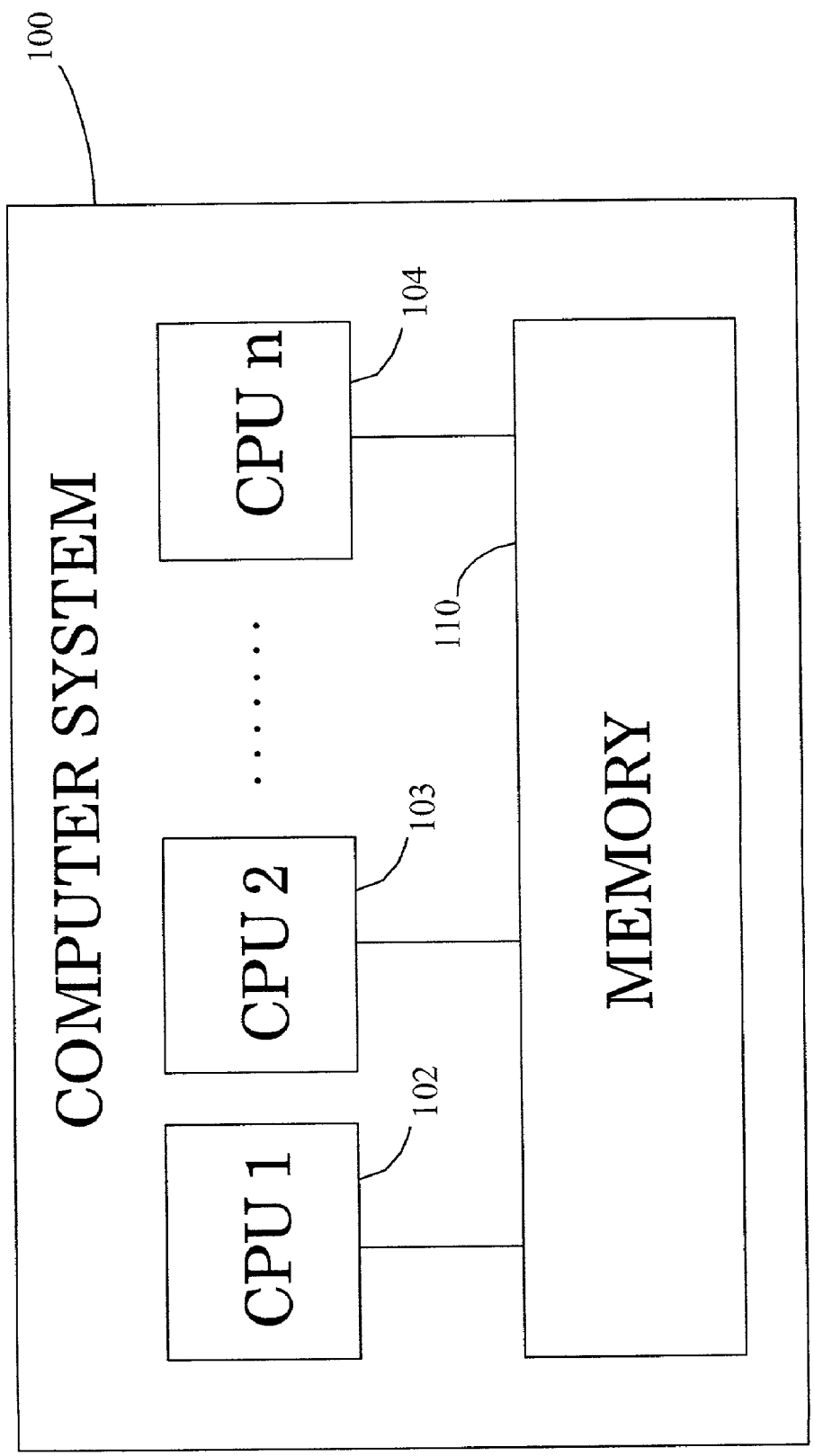
FIG. 1 is a block diagram of a typical computer system wherein the present invention may be practiced.

FIG. 1 is a block diagram of a computer system 100, such as the S/390 mainframe computer system. (S/390 is a registered trademark of International Business Machines Corporation in the United States, other countries, or both.) The computer system 100 comprises one or more central processing units (CPUs) 102, 103, and 104. The CPUs 102–104 suitably operate together in concert with memory 110 in order to execute a variety of tasks. In accordance with techniques known in the art, other components may be utilized with computer system 100, such as input/output devices comprising direct access storage devices (DASDs), printers, tapes, etc. (not shown). Although the preferred embodiment is described in a particular hardware environment, those skilled in the art will recognize and appreciate that this is meant to be illustrative and not restrictive of the present invention. Accordingly, other alternative hardware environments may be used without departing from the scope of the present invention.

Figure 2:
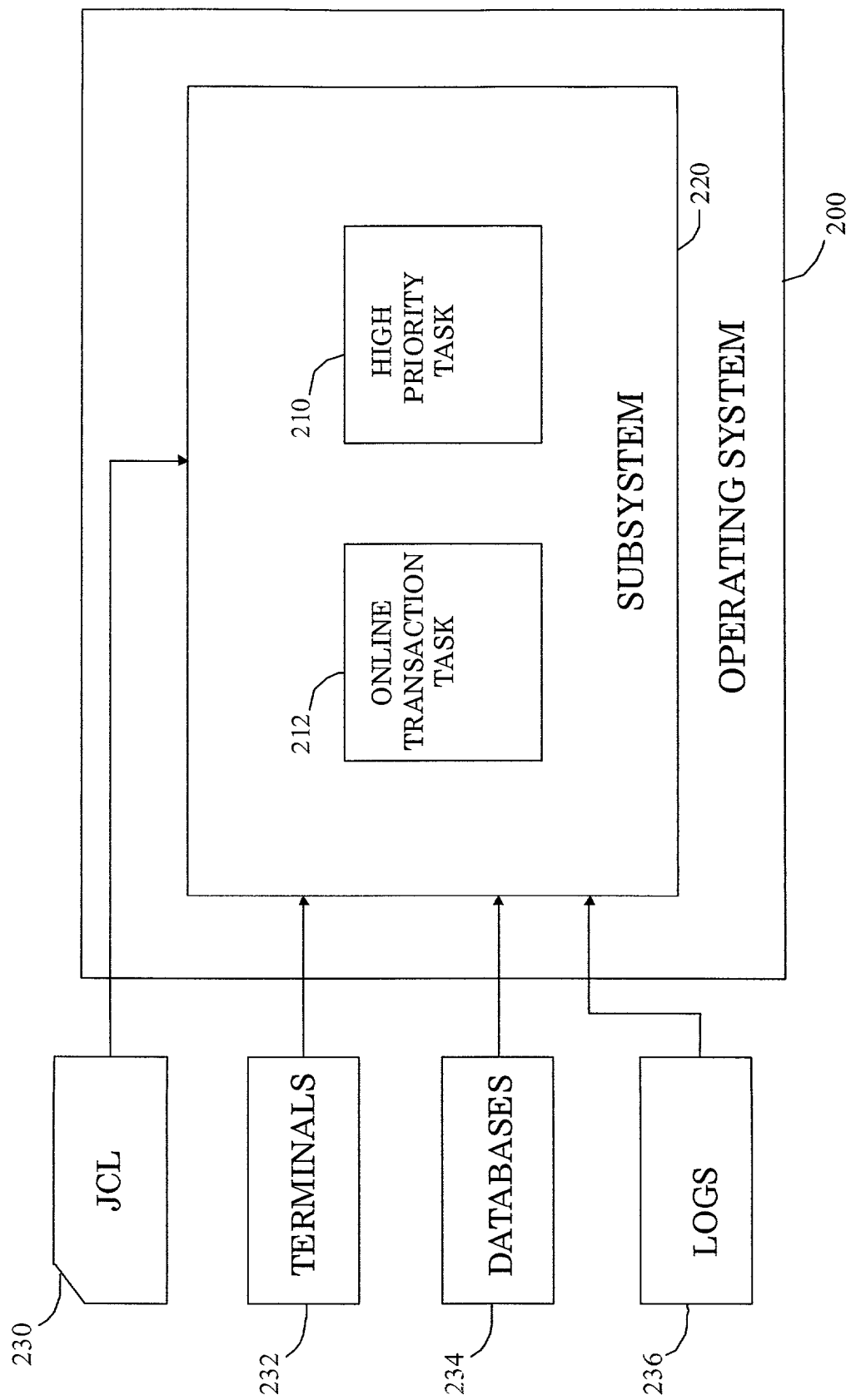
FIG. 2 is a block diagram of an exemplary operating system and subsystem executing a high priority task in accordance with one embodiment of the present invention.

Referring now to FIG. 2, a block diagram is shown illustrating an exemplary operating system 200, such as the MVS/ESA operating system, suitable for managing the resources of computer system 100 and providing the framework for running one or more computer subsystems 220 and/or various other computer programs. (MVS/ESA is a trademark of International Business Machines Corporation in the United States, other countries, or both.) Subsystems functionally capable of being provided under the MVS/ESA operating system include the IMS subsystem.

Other resources that may communicate with, or are managed by, computer subsystem 220 comprise terminals 232, databases 234, logs 236 and job control language (JCL) 230. Databases 234 may comprise several different types of databases, and, for an IMS subsystem, may include databases of the type DEDB, HDAM, HALDB, HIDAM and HISAM.

Computer subsystem 220 is suitable for executing tasks in accordance with the preferred embodiment and comprises high priority task 210 invoked by an online command utilizing terminal 232 or by JCL 230. Computer subsystem 220 may also comprise other tasks, such as one or more online transaction tasks 212. Those of ordinary skill in the art will recognize that FIG. 2 is exemplary in nature and that many other configurations are possible within the scope of the present invention. For example, in an alternative configuration, high priority task 210 may execute directly under the control of operating system 200 and subsystem 220 may or may not be present. Those of ordinary skill in the art will further recognize that high priority task 210, in a specific embodiment, may take the form of an IMS database reorganization task operating under the control of an IMS subsystem on computer system 100.

Generally, high priority task 210 is tangibly embodied in and/or readable from a computer-readable medium containing the program code (or alternatively, computer instructions), which when read and executed by computer system 100 causes computer system 100 to perform the steps necessary to implement and/or use the present invention. Thus, the present invention may be implemented as a method, an apparatus, or an article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Examples of a computer readable device, carrier or media include, but are not limited to, palpable physical media such as a CD ROM, diskette, hard drive and the like, as well as other non-palpable physical media such as a carrier signal, whether over wires or wireless, when the program is distributed electronically.

Figure 3:
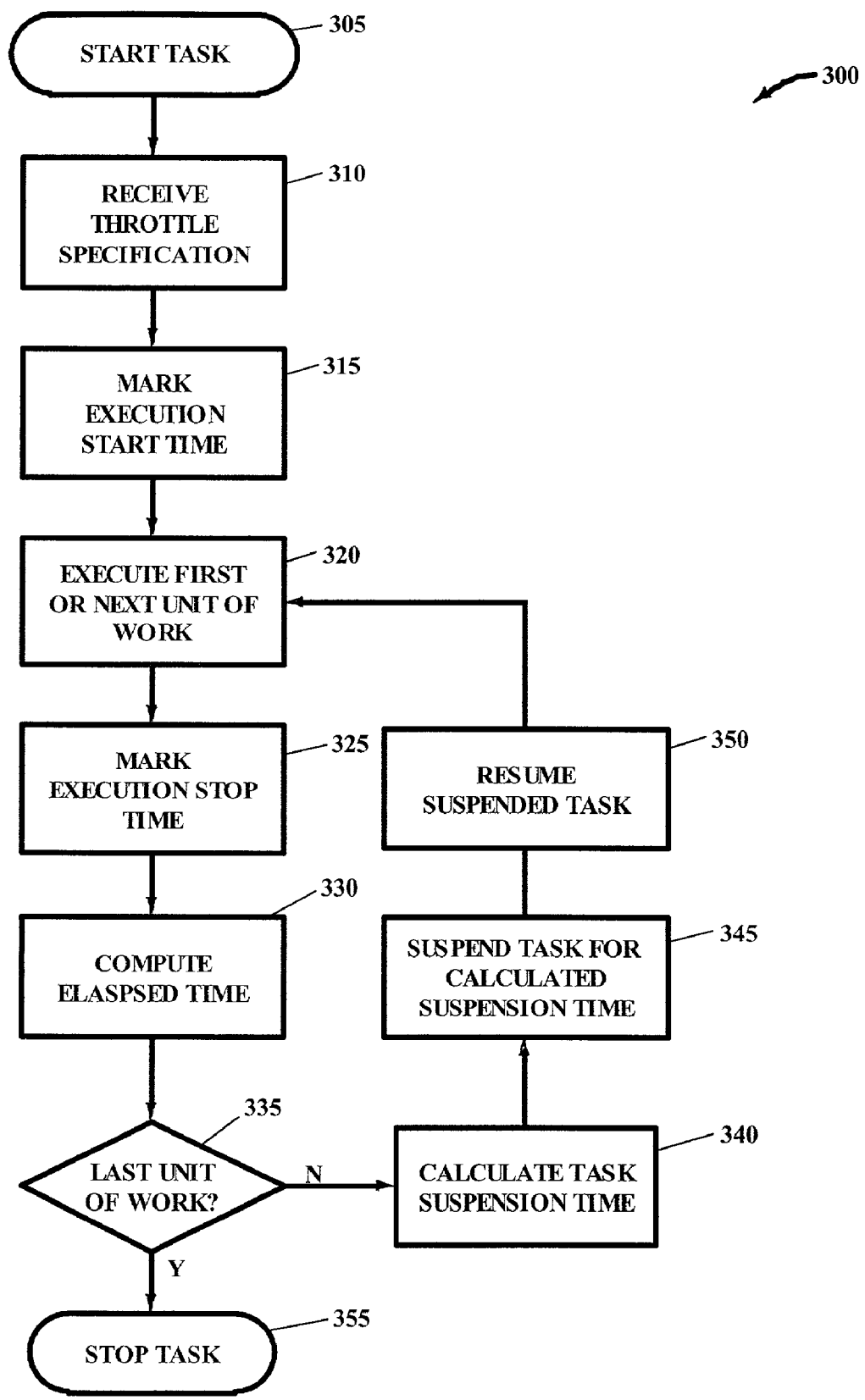
FIG. 3 is a flow diagram illustrating the self-throttling of computer resources by a high priority computing task.

Referring now to FIG. 3, flow diagram 300 is shown wherein the method steps of the preferred embodiment are disclosed. In step 305, subsystem 220 or operating system 200 dispatches high priority task 210. High priority task 210 receives a throttle specification, in step 310, from the invoking operating system or subsystem. The throttle specification is in the form of a recommended percentage value where the value represents the percentage of CPU cycles available to high priority task 210 to be dedicated to high priority task 210.

For example, a throttle specification of 40 means that out of 100 units of CPU processing time potentially available to high priority task 210 executing on computer system 100, only 40 units of this processing time should be dedicated to high priority task 210. Additionally, this means that out of this same 100 units, 60 units are available to perform other work, such as work represented by online transaction task 212. Those of ordinary skill in the art will recognize that using a percentage value for a throttle specification is exemplary and that a throttle specification may take other forms. For example, a throttle specification could be a relative specification such as "LOW", "MEDIUM" or "HIGH" directing high priority task 210 to give up small, moderate or large amounts of available units available in accordance with the throttle specification.

Continuing with step 315, high priority task 210 invokes an operating system service to note the system clock time at the beginning of a first or next unit of work to be performed by task 210. In step 320, this unit of work is executed by task 210 and upon completion of this unit of work, in step 325, the operating system service to note the system clock time is invoked once again. Those of ordinary skill in the art will recognize that various operating system services may be available to enable a computer program to obtain or monitor system clock values. An example of this service includes the TIME macro available on the MVS/ESA operating system.

Next, in step 330, an elapsed time is computed by subtracting the clock value obtained at step 315 from the clock value obtained at step 325. In step 335, a test is made to determine if additional units of work need to be performed by high priority task 210 and, if so, control passes to step 340 where a suspension time is calculated. The suspension time is calculated by the formula $st=(et*(100-pv))/pv$ where st is the suspension time to be calculated by step 340, et is the elapsed time computed in step 330 and pv is the percentage value received for the throttle specification in step 310. Those of ordinary skill in the art will recognize that a virtual unlimited number of formulae and throttle specifications could be utilized and still be within the spirit and scope of the present invention which is directed to the self-throttling of high priority tasks. For example, in the simplest of embodiments, the throttle specification may be a binary indicator directing high priority task 210 to either suspend itself or not. Further, in this simple implementation, the suspension time may be an assigned constant value.

Following the calculation of a suspension time in step 340, high priority task 210 is suspended, in step 345, for the duration of this calculated suspension time. Following the exhaustion of the calculated suspension time, high priority task 210 is resumed in step 350 and control then returns to step 320 to repeat this process with the next unit of work. Returning now to step 335, if the last unit of work was completed, high priority task 210 terminates (step 355).

Taken in combination, FIGS. 1, 2 and 3 together with the above description provide for advantageous utilization of computer resources when long running, high priority computing tasks are executing in the presence of other important computing tasks, such as online transactions. High priority task 210, operating in conjunction with prior art workload management systems, may monopolize computer resources to the exclusion of other important work in the system. To the extent that this other work represents online transactions, this monopolization may result in extreme frustration to the computer system users as response times degrade to unacceptable levels. However high priority task 210, operating in accordance with the present invention, provides for the utilization of computer resources by other tasks while at the same time retaining its high priority status and the predictability of a timely completion.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. §112, sixth paragraph, unless the element is expressly recited using the phrase "means for" or "step for."

While the preferred embodiment of the present invention has been described in detail, it will be understood that modification and adaptations to the embodiment(s) shown may occur to one of ordinary skill in the art without departing from the scope of the present invention as set forth in the following claims. Thus, the scope of this invention is to be construed according to the appended claims and not just to the specific details disclosed in the exemplary embodiments.

What is claimed:

1. A method for self-throttling the use of computer resources by a computer task executing on a computer system, said method comprising:
   receiving by said computer task a throttle specification for directing said computer task's usage of said computer resources;
   executing said computer task until a first unit of work is completed, said computer task comprising said first unit of work and at least a second unit of work;
   calculating the elapsed time of said first unit of work;
   calculating a suspension time for said computer task based at least partially on said throttle specification and said elapsed time; and
   suspending said computer task for said calculated suspension time prior to resuming execution of said computer task, whereby other computing tasks within said computer system gain access to said computer resources during said suspension of said computer task.

2. The method of claim 1 further comprising resuming execution of said computer task and commencing said second unit of work following the exhaustion of said suspension time.

3. The method of claim 2 wherein said computer task performs a database reorganization.

4. The method of claim 3 wherein said database is an IMS HALDB database.

5. The method of claim 1 wherein said throttle specification is a percentage value, said percentage value representing the percentage of said computer resources on said computer system to be dedicated to said computer task.

6. The method of claim 5 wherein said suspension time is calculated by using the formula $st=(et*(100-pv))/pv$ where st is said suspension time, et is said elapsed time and pv is said percentage value.

7. The method of claim 1 wherein said computer task self-throttles the usage of said computer resources by said computer task in accordance with said throttle specification.

8. An article of manufacture for use in a computer system tangibly embodying computer instructions executable by said computer system to perform process steps for self-throttling the use of computer resources by a computer task executing on a computer system, said process steps comprising:
   receiving by said computer task a throttle specification for directing said computer task's usage of said computer resources;
   executing said computer task until a first unit of work is completed, said computer task comprising said first unit of work and at least a second unit of work;
   calculating the elapsed time of said first unit of work;
   calculating a suspension time for said computer task based at least partially on said throttle specification and said elapsed time; and
   suspending said computer task for said calculated suspension time prior to resuming execution of said computer task, whereby other computing tasks within said computer system gain access to said computer resources during said suspension of said computer task.

9. The article of manufacture of claim 8 further comprising resuming execution of said computer task and commencing said second unit of work following the exhaustion of said suspension time.

10. The article of manufacture of claim 9 wherein said computer task performs a database reorganization.

11. The article of manufacture claim 10 wherein said database is an IMS HALDB database.

12. The article of manufacture of claim 8 wherein said throttle specification is a percentage value, said percentage value representing the percentage of said computer resources on said computer system to be dedicated to said computer task.

13. The article of manufacture of claim 12 wherein said suspension time is calculated by using the formula st(et*(100−pv))/pv where st is said suspension time, et is said elapsed time and pv is said percentage value.

14. The article of manufacture of claim 8 wherein said computer task self-throttles the usage of said computer resources by said computer task in accordance with said throttle specification.

15. A computer system for self-throttling the use of computer resources by a computer task executing on said computer system, said computer system comprising:
 a computer;
 computer program instructions stored in a computer-readable medium for receiving by said computer task a throttle specification for directing said computer task's usage of said computer resources;
 computer program instructions stored in a computer-readable medium for executing said computer task until a first unit of work is completed, said computer task comprising said first unit of work and at least a second unit of work;
 computer program instructions stored in a computer-readable medium for calculating the elapsed time of said first unit of work;
 computer program instructions stored in a computer-readable medium for calculating a suspension time for said computer task based at least partially on said throttle specification and said elapsed time; and
 computer program instructions stored in a computer-readable medium for suspending said computer task for said calculated suspension time prior to resuming execution of said computer task, whereby other computing tasks within said computer system gain access to said computer resources during said suspension of said computer task.

16. The system of claim 15 further comprising resuming execution of said computer task and commencing said second unit of work following the exhaustion of said suspension time.

17. The system of claim 16 wherein said computer task performs a database reorganization.

18. The system of claim 17 wherein said database is an IMS HALDB database.

19. The system of claim 15 wherein said throttle specification is a percentage value, said percentage value representing the percentage of said computer resources on said computer system to be dedicated to said computer task.

20. The system of claim 19 wherein said suspension time is calculated by using the formula st=(et*(100−pv))/pv where st is said suspension time, et is said elapsed time and pv is said percentage value.

21. The system of claim 15 wherein said computer task self-throttles the usage of said computer resources by said computer task in accordance with said throttle specification.

* * * * *